United States Patent [19]

Schlunke

[11] Patent Number: 4,807,572

[45] Date of Patent: Feb. 28, 1989

[54] TIMING OF FUEL INJECTED ENGINES

[75] Inventor: Christopher K. Schlunke, Kingsley, Australia

[73] Assignee: Orbital Engine Company Proprietary Limited, Balcatta, Australia

[21] Appl. No.: 40,776

[22] PCT Filed: Jul. 18, 1986

[86] PCT No.: PCT/AU86/00204

§ 371 Date: Mar. 11, 1987

§ 102(e) Date: Mar. 11, 1987

[87] PCT Pub. No.: WO87/00579

PCT Pub. Date: Jan. 29, 1987

[30] Foreign Application Priority Data

Jul. 19, 1985 [AU] Australia ............... PH01561

[51] Int. Cl.[4] .............................. F02B 33/04
[52] U.S. Cl. .................... 123/73 C; 123/500
[58] Field of Search ............... 123/73 B, 73 C, 73 SP, 123/500, 501, 294, 305

[56] References Cited

U.S. PATENT DOCUMENTS

| | | | |
|---|---|---|---|
| 2,246,019 | 6/1941 | Steinlein | 123/73 C |
| 3,190,271 | 6/1965 | Gudmundsen | 123/73 C |
| 4,062,335 | 12/1977 | Rank | 123/501 |
| 4,217,871 | 8/1980 | Ohashi et al. | 123/299 |
| 4,235,374 | 11/1980 | Walter et al. | 123/500 |
| 4,407,241 | 10/1983 | Butler et al. | 123/501 |
| 4,445,468 | 5/1984 | Onishi et al. | 123/73 C |
| 4,628,881 | 12/1986 | Beck et al. | 123/501 |
| 4,700,668 | 10/1987 | Schierling et al. | 123/73 C |

FOREIGN PATENT DOCUMENTS 0057430  5/1977  Japan .............................. 123/73 C Primary Examiner—Charles J. Myhre
Assistant Examiner—David A. Okonsky
Attorney, Agent, or Firm—Armstrong, Nikaido, Marmelstein & Kubovcik

[57] ABSTRACT

A method of operating a two-stroke spark ignition engine (9) wherein the fuel is injected directly into the combustion chamber (22). The timing of the injection of the fuel is varied according to engine load and speed conditions. Under low load and speed conditions at least 80% of the fuel is injected after closure of the exhaust port (20) whereas under some high load conditions at least 80% of the fuel is injected before closure of the exhaust port (20). The method may also comprise adjustment of ignition timing so that, in conjunction with low load and speed conditions, ignition occurs at least 5° of crankshaft rotation after commencement of fuel injection and up to 70° before top dead center of the engine cycle.

36 Claims, 4 Drawing Sheets

TIMING OF FUEL INJECTED ENGINES

This invention relates to the timing of the injection-ignition phase of a spark ignited internal combustion engine where the fuel is injected directly into the combustion chamber of the engine.

In order to obtain the more desirable levels of fuel efficiency and exhaust emission control it is desirable to control the position of the atomised fuel cloud in the combustion chamber. It has been observed that the preferred cloud position is not constant, and particularly varies with engine load, and speed. In two stroke cycle engines the control of the fuel cloud is of particular importance to limit the loss of fuel through the exhaust port which may not be fully closed during at least part of the period of injection of the fuel.

It is understood that under light loads, and hence low fuelling rates, the degree of distribution of the fuel in the cylinder should be restricted to reduce the degree of dilution of the fuel by mixing with the gas in the combustion chamber. The dilution of the fuel gives a lean mixture that is more difficult to ignite, and to maintain combustion until the full fuel charge is burnt. However at high load and high fuelling rate the degree of distribution should be increased to ensure the greater quantity of the fuel has access to sufficient air (oxidant) to achieve combustion of all of the fuel.

It is known to be desirable to establish a stratified fuel charge in the combustion chamber particularly at low engine loads and speeds, so that a fuel rich charge is located in the vicinity of the spark plug. However at low engine speeds there is a time interval between fuel injection and ignition which may permit a wide dispersion of the fuel within the combustion chamber. Further, at high loads at relatively high engine speeds, where dispersion of the fuel is desirable, less time is available between fuel injection and ignition to achieve that dispersion. This problem is aggravated by the fact that it has been commonly believed desirable to commence injection of the fuel after, or only shortly before, exhaust port closure. This practice is based on the belief that earlier injection would result in some of the newly injected fuel being carried out through the exhaust port before it is closed. However such practices are not conductive to achieving the required fuel distribution at low and high engine speeds respectively, and thus contribute to potential incomplete combustion of all the fuel and to resultant undesirable exhaust emissions, particularly hydrocarbons (HC).

It is therefore an object of the present invention to provide a method of operating an engine, particularly a two stroke cycle engine, that will contribute to control of the fuel distribution in the engine combustion chamber in a manner to assist reduction in exhaust emissions.

With this object in view there is provided by one aspect of the present invention, a method of operating a spark ignited two cycle internal combustion engine having a combustion chamber, and an exhaust port opened and closed in time relation to the engine cycle to control the exhausting of gases from the combustion chamber, said method comprising, injecting a metered quantity of fuel directly into the combustion chamber so that at low engine loads and speeds at least 80% of the metered quantity of fuel is delivered into the combustion chamber after the exhaust port has closed, and at least at some high engine loads of at least 80% of the metered quantity of fuel is delivered to the combustion chamber before the exhaust port is closed.

The timing of the fuel injection so that the fuel is injected later in the compression stroke, after exhaust port closure, results in a short time being available for the fuel to disperse within the combustion chamber. This is desirable at low engine loads, and particularly at low engine loads and speeds. Also the injection of the fuel after exhaust port closure means that there is somewhat less movement of the gases in the combustion chamber, which also contributes to limiting fuel dispersion. Naturally escape of fuel through the exhaust port is prevented if fuel injection occurs after exhaust port closure.

However under high engine load the fuel is injected earlier in the engine cycle so injection is substantially completed by the time the exhaust port is closed. This provides more time for distributing the fuel within the combustion chamber than is available with later injection timings, particularly in comparison with previously used injection timings when injection is substantially effected after exhaust port closure for all operating conditions.

In many engines, or under certain high load and speeds operating conditions it may be preferred to have substantially all of the fuel delivered to the combustion chamber before exhaust port closure, however considerable improvement in fuel dispersion control may be achieved if only at least 80% of the metered quantity is so delivered. Similarly at low lows and speeds significant improvement is obtained by at least 80% of the metered quantity being delivered after exhaust port closure, but usually under these operating conditions, injection is not commenced until after exhaust port closure.

Conveniently at low loads and speeds, commencement of injection may be as late as 10° or even 5° of crank angle rotation before ignition of the fuel charge in the combustion chamber. At low engine load it has been found to be desirable to ignite the fuel as early as 70° of crank angle rotation before the top dead centre (TDC) point in the engine cycle, that is the point of minimum volume of the combustion chamber. Preferably ignition at low loads may be in the range of 40° to 70° before TDC.

Under high load operating conditions it has been found that injection of the fuel may be commenced before the bottom dead centre (BDC) position in the engine cycle (maximum combustion chamber volume) particularly at speeds above 3000 RPM. In fact at very high loads and speed injection may commence before exhaust port opening which usually occurs before BDC.

It is to be understood that there is some time lag between commencement of activation of the injecton apparatus and the actual delivery of fuel into the combustion chamber and, for some fuel injection apparatus, between termination of fuel delivery and actual injector closure. Accordingly in practice there is a difference between the actual time between commencement of opening and final closure of the injection valve, and the period of delivery of fuel. This factor should be considered when determining the proportion of the metered quantity of fuel delivered to the combustion chamber at any selected point in the engine cycle.

In accordance with a further aspect of the present invention, and with the previous stated object in view, there is provided a method of operating an internal combustion engine comprising injecting a metered quantity of fuel directly into an engine combustion chamber to establish a stratified fuel distribution in the gas charge in the combustion chamber, and controlling the timing of ignition of said fuel so that under low engine loads ignition is effected between 40° and 70° of crank angle rotation before TDC. Preferably ignition is effected at or before 50° and preferably later than 65° before TDC.

The igniting of the fuel at such a point in the engine cycle results in combustion commencing in the fuel at the point of ignition when the gas charge has not been fully compressed, and consequently dispersion of fuel into a large portion of the gas charge has not occured. It is believed that the high pressure created by the commencement of combustion limits the flow of further gas charge into the fueled area of the combustion chamber as compression of the gas charge continues as the piston rises and also limits the dispersion of fuel into the gas charge compared with what would occur with normally used later ignition timings. Accordingly the early ignition timing provides a control of the fuel distribution which is essential at low loads and speeds to achieve combustion of a very high proportion of the fuel and so limit exhaust emissions, particularly hydrocarbons.

The above discussed control of the fuel dispersion resulting from early ignition is particularly effective in engines having a cavity into which the fuel is injected and wherein ignition is initiated. In such engines the squish effect, whereby in the latter stage of compression charge gas is displaced laterally to enter the cavity at high velocity to promote a high degree of mixing of the fuel with a large portion of the charge gas. However the high pressure created in such a cavity by the presently proposed early ignition timing opposes the squish effect to limit mixing of the fuel with the charge gas.

Preferably at low engine loads and speeds including loads up to 25% of the maximum load attainable at a particular speed, at least 80%, and preferably all of the metered quantity of fuel available for injection to the combustion chamber per engine cycle, is delivered into the combustion chamber after the closure of the port regulating the exhausting of gas from the chamber. At high engine load and speeds it is desirable to delivere to the combustion chamber up to 80% of the metered quantity of fuel before the exhaust port is closed.

Low and high engine speeds and terms relative to the each particular engine considered and will be understood by the skilled worker in the art. However as a general guide, in the context of a two stroke cycle engine for modern automotive applications, low speed could be considered as less than 1500 RPM and high spoeed as that above 50% of maximum speed. If the idle speed is above 1500 RPM then the idle speed would be appropriate as the low speed figure. The range of high engine speeds suggested above may appear to the unskilled as including an excessively broad range, however in the normal driving cycle of automobile type engines speeds rarely exceed 50% of its maximum speed.

Similarly the relative terms low and high engine loads will be generally understood by the skilled worker. However, again as a general guide, in the context of a two stroke cycle engine for modern automotive applications, high loads can be considered as those greater than 75% of the maximum load achievable by the engine at that speed, while low loads are those less than 30% of the maximum load achievable by the engine at that speed.

It will be understood that reference to a percentage engine load is that percentage of maximum load attainable by the engine at the particular speed under consideration.

The invention will be more readily understood from the following description of a typical engine and fuel injection system for carrying into practice of the present invention, with reference to the accompanying drawings.

In the drawings.

Figure 1:
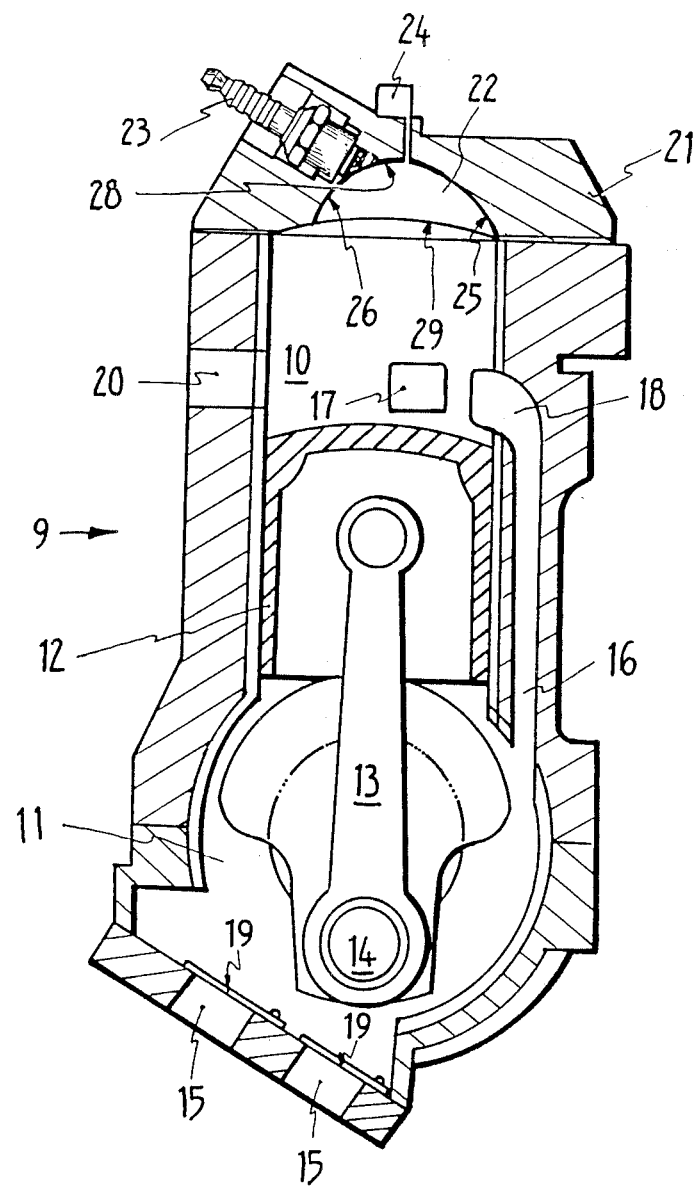
FIG. 1 is a sectional view of a two stroke cycle engine to which the presently proposed method of combustion control is applicable.

Referring now to FIG. 1 the engine 9 is a single cylinder two stroke cycle engine, of generally conventional construction, having a cylinder 10, crankcase 11 and piston 12 that reciprocates in the cylinder 10. The piston 12 is coupled by the connecting rod 13 to the crankshaft 14. The crankcase isprovided with air induction ports 15, incorporating conventional reed valves 19, and the transfer passages 16 (only one shown) communicate the crankcase with respective transfer ports, two of which are shown at 17 and 18, the third being the equivalent to 17 on the opposite side of port 18.

The transfer ports are each formed in the wall of the cylinder 10 with their respective upper edge located in the same diametral plane of the cylinder. An exhaust port 20 is formed in the wall of the cylinder generally opposite the central transfer port 18. The upper edge of the exhaust port is slightly above the diametral plane of the transfer ports' upper edges, and will accordingly close later in the engine cycle.

The detachable cylinder head 21 has a combustion cavity 22 into which the spark plug 23 and fuel injector nozzle 24 project. The cavity 22 is located subsftantially symmetrically with respect to the axial plane of the cylinder extending through the centre of the transfer port 18 and exhaust port 20. The cavity 22 extends across the cylinder from the cylinder wall immediately above the transfer port 18 to a distance past the cylinder centre line.

The cross sectional shape of the cavity 22 along the above referred to axial plane of the cylinder is substantially arcuate at the deepest point or base 28, with the centre line of the arc somewhat closer to the centre line of the cylinder than to the cylinder wall above the transfer port 18. The end of the arcuate base 28 closer to the cylinder wall above the transfer port 18, merges with a generally straight face 25 extending to the underface 29 of the cylinder head 21 at the cylinder wall. The face 25 is inclined upwardly from the cylinder wall to the arcuate base 28 of the cavity.

The opposite or inner end of the arcuate base 28 merges with a relatively short steep face 26 that extends to the underface 29 of the cylinder head. The face 26 also meets the underface 29 at a relatively steep angle. The opposite side walls of the cavity (one only being shown at 27) and generally flat and parallel to the above referred to axial plane of the cylinder, and so also meet the underface 29 of the cylinder head at a steep angle.

The injector nozzle 24 is located at the deepest part of the cavity 22, while the spark plug 23 projects into the cavity 22 at the face of the cavity remote from the transfer port 18. Accordingly, the air charge entering the cylinder will pass along the cavity past the injector nozzle 24 toward the spark plug and so carries the fuel from the nozzle to the spark plug.

Further details of the form of the cavity 22 and of the combustion process derived therefor are disclosed in British patent application No. 8612601 lodged on the May 23, 1986 and the corresponding U.S. patent application lodged on the May 26, 1986 entitled "Improvements Relating to Two Stroke Cycle Internal Combustion Engines" by Schlunke and Davis, the disclosures of each being hereby incorporated herein by this in reference.

The shape and disposition of the cavity 22 as above described and as further described in the above identified patent applications will promote the formation of a stratified fuel distribution in the combustion chamber. This stratification is further assisted by the late timing of the fuel injection into the cavity 22 under low load operating conditions. Stratification of the fuel is further assisted by the use of a low spray penetration nozzle for the injection of the fuel. A particularly suitable nozzle is disclosed in the specification of our Australian patent application No. PH01557 entitled "Improvements Relating to Nozzles for Fuel Injection Systems", inventors Peter Ragg and Roy Brooks, and the corresponding application lodged in the United States this day, the disclosure of each being hereby incorporated in this specification by reference.

Figure 2:
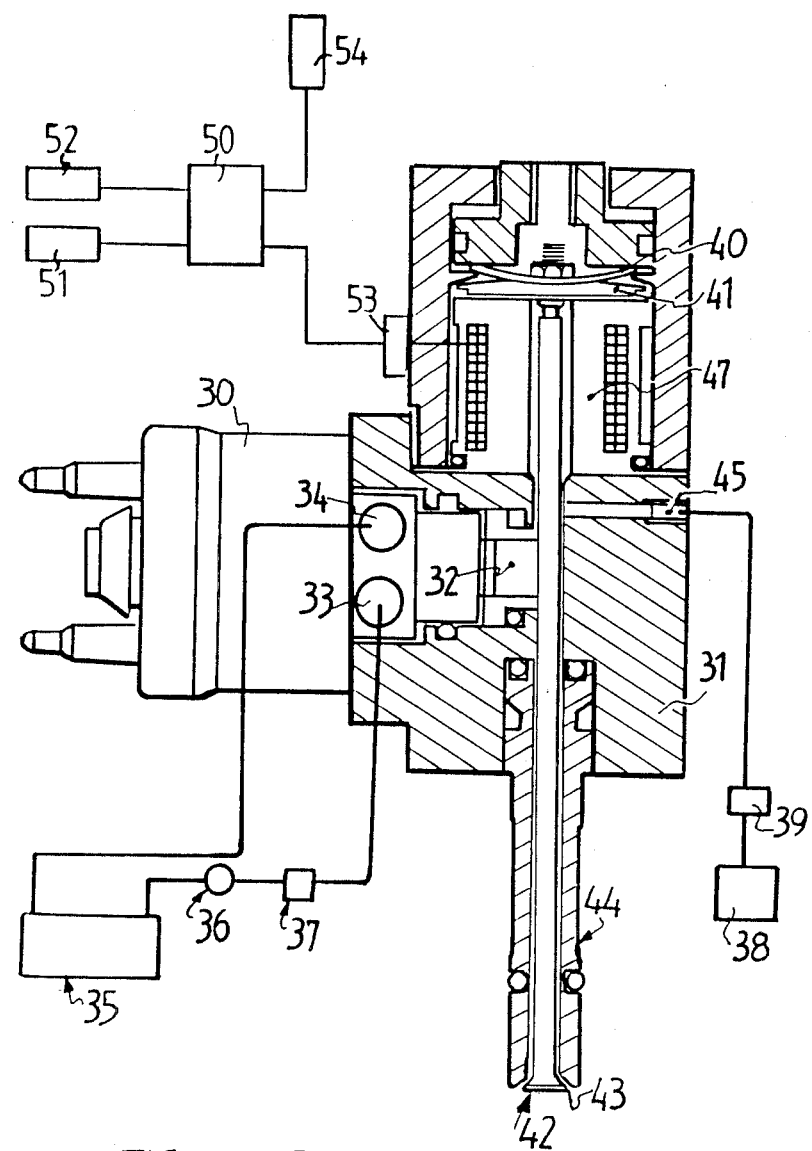
FIG. 2 is an elevational view partly in section of a fuel metering and injection device for use in the delivery of fuel to the engine shown in FIG. 1, together with the diagrammatical connections to ancillary apparatus.

The injector nozzle 24 is an integral part of a fuel metering and injection system whereby fuel entrained in air is delivered to the combustion chamber of the engine by the pressure of the air supply. One particular form of such a fuel metering and injection unit is illustrated in FIG. 2 of the drawings.

The fuel metering and injection unit incorporates a suitable commerically available metering device 30, such as an automative type throttle body injector, coupled to an injector body 31 having a holding chamber 32 therein. Fuel is drawn from the fuel reservoir 35 by the fuel pump 36 via the pressure regulator 37 and delivered through fuel inlet port 33 to the metering device 30. The metering device operating in a known manner meters an amount of fuel into the holding chamber 32 in accordance with the engine fuel demand. Excess fuel supplied to the metering device is returned to the fuel reservoir 35 via the fuel return port 34. The particular construction of the fuel metering device 30 is not critical to the present invention and any suitable device may be used.

In operation, the holding chamber 32 is pressurised by air supplied from the air source 38 via pressure regular 39 air inlet port 45 in the body 31. Injection valve 43 is actuated to permit the pressurised air to discharge the metered amount of fuel through injector nozzle 42 into a combustion chamber of the engine. Injection valve 43 is of the poppet valve construction opening inwardly to the combustion chamber, that is, outwardly from the holding chamber.

The injection valve 43 is coupled, via avalve stem 44, which passes through the holding chamber 32, to the armature 41 of solenoid 47 located within the injector body 31. The valve 43 is biased to the closed position by the disc spring 40, and is opened by energising the solenoid 47.

Further details of the operation of this fuel injection system is closed in Australian patent application No. 32132/84 and the corresponding U.S. patent application No. 740,067 filed Apr. 2, 1985 and now U.S. Pat. No. 4,693,224, the disclosures of which are incorporated herein by reference.

The energising of the solenoid 47 is timed in relation to the engine cycle by a suitable electronic processor 40. The processor receives an input signal from the speed sensor 51 which signal is indicative of the engine speed and also identifies a reference point in the engine cycle in respective of which operations may be timed in relation to the engine cycle. The processor 50 also receives a signal from the load sensor 52 which signal is indicative of the air flow rate to the engine air induction system. The processor is programmed to determine from the air flow rate signal the load demand on the engine.

The processor 50 is further programmed to determine from the speed and load conditions of the engine the required timing of the injection of the fuel into the combustion chamber.

Conveniently the processor incorporates a multipoint map designating the required injection timing for a range of engine loads and speeds, these having been determined from tests carried out to obtain required engine power and exhaust emission levels. The process is similarly programmed to determine and control the ignition timing of the engine in relation to engine load and speed.

The processor provides appropriate signals to the injector actuator 53 and ignition actuator 54, in accordance with the determinations, to energise the solenoid 47 at the required time for fuel injection, and activate the spark plug 23 at the required time for ignition. The generation construction of the load and speed sensors suitable for use as above indicated are well known in the industry, as are processors for performing the functions required by the processor 50.

Figure 3:
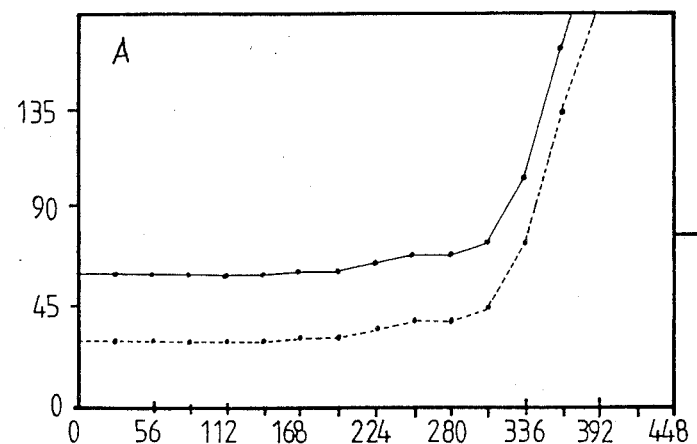
FIGS. 3 and 4 are a series of graphs showing the timing of fuel injection for different speeds of the engine in FIG. 1.
Figure 3:
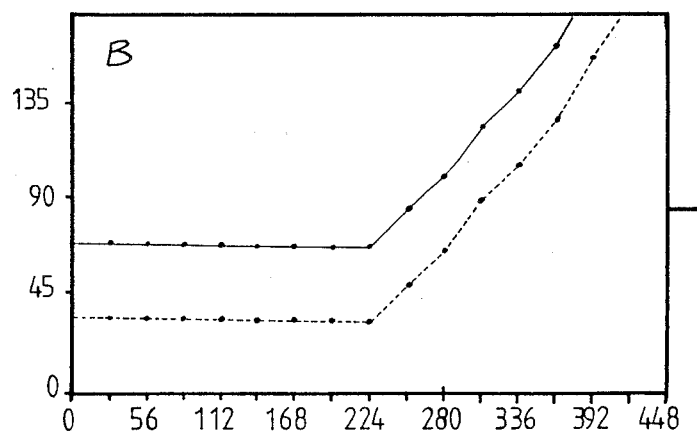
Figure 3:
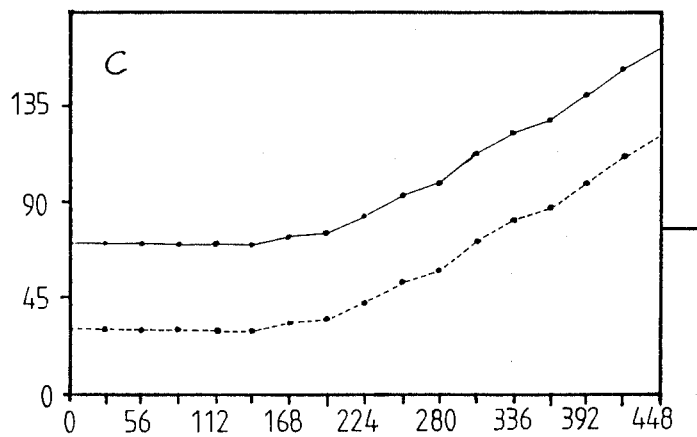

FIG. 3 shows a set of three plots of the start of fuel injection and the end of fuel injection, for three different engine speeds within the load speed range, as controlled in relation to engine load. Plot A is for a speed of 1100 RPM, plot B for 1300 RPM and plot C for 1500 RPM. The data represented by the plots are from tests on a two stroke cycle engine as generally illustrated in FIG. 1 wherein the exhaust port opens at 270° before top dead centre (BTDC), and closes 90° BTDC.

Figure 4:
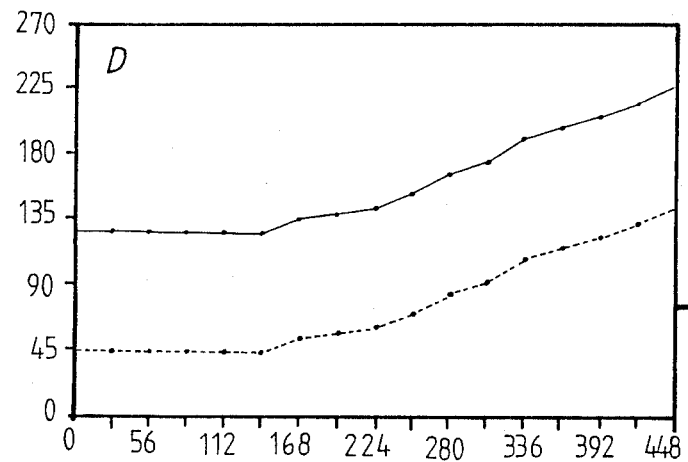
Figure 4:
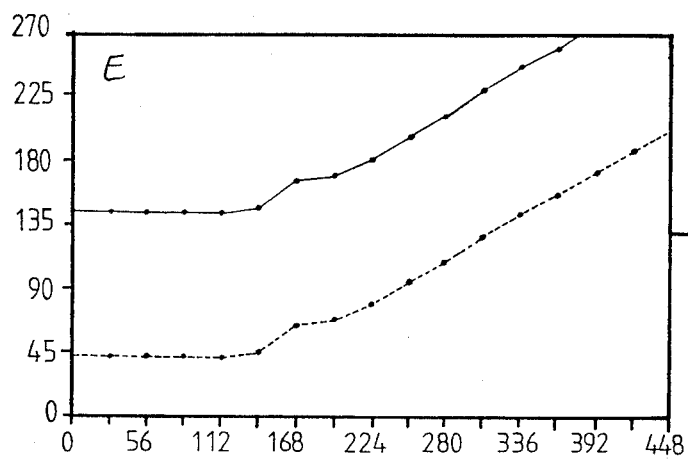
Figure 4:
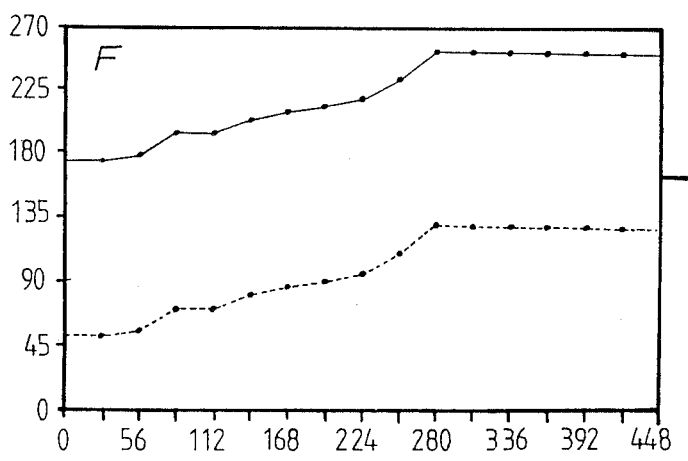

FIG. 4 shows a set of three plots of injection timing on the same basis as in FIG. 3 but are in relation to three engine speeds in the high speed range of the same engine. Plot D is for a speed of 3000 RPM, plot E for 3750 RPM and plot F for 4500 RPM.

The plots in FIGS. 3 and 4 show the start and end of injection relative to the crank angle before the top dead centre point in the engine cycle (BTDC) against the engine load represented by the air charge per engine cycle for each cylinder of the engine measured in milligrams. The air charge has a direct relation to engine load. The solid line represents the start of fuel injection and the broken line the end of fuel injection.

From FIG. 3, those plots relating to low speed operation show that fuel injection is started well after exhaust port closure which occurs at 90° BTDC, and that at 1100 RPM, this situation exists over a major part of the load range. It is observed from the three plots that the start of injection commences to move towards exhaust port closure at progressively lower engine loads as the engine speed increases. However, even at 1500 RPM it is still well after exhaust port closure and start of injection does not commence to move towards EPC until about 25% of maximum load, and does not move into the before exhaust port closure period until the engine is operating at above approximately 50% of maximum load.

It is to be understood that at low speeds at least 80%, and preferably all, of the fuel will be injected after exhaust port closure at load up to 25% of the maximum load attainable at that particular speed.

The high engine speed plots in FIG. 4 show a continuance of the trend referred to above in relation to FIG. 3, in that as the engine speed increases the start of injection timing is progressively earlier in the cycle. At 3000 RPM and loads above about 60% of maximum load, injection of the fuel starts and ends before closure of the exhaust port. As the engine speed increases the load at which all fuel is injected before exhaust port closure progessively decreases. At 4500 RPM all fuel is injected before exhaust port closure at all loads above about 30% of full load.

It is to be noted that at the speeds represented by the plots in FIG. 4 start of injection is before bottom dead centre (180° BTDC) for all loads above about 60% of maximum engine load, and as speed increases this percentage of the maximum engine load decreases. At 4500 RPM start of injection before bottom dead centre exists at all loads above about 15% of maximum engine load. Also it will be noted that at 3750 RPM and very high loads injection starts earlier than 270° BTDC, that is even before exhaust port opening.

In the present specification specific reference has been made to the use of the present invention in conjunction with an engine operating on the two stroke cycle and with spark ignition, however it is to be understood that the invention is also applicable to engines operating on the four stroke cycle. The invention is applicable to internal combustion engines for all uses but is particularly useful in contributing to fuel economy and control of exhaust emissions in engines for vehicles, including automobiles, motor cycles and boats including outboard marine engines.

In this specification the term "high loads and speeds" is used to mean both high loads and high speeds as simultaneous conditions for the engine, rather than alternatives. Similarly "low loads and speeds" refers to the situation where both those conditions are simultaneously occuring.

I claim:

1. A method of operating a spark ignited two cycle internal combustion engine having a combustion chamber, and an exhaust port opened and closed in timed relation to the engine cycle to control the exhausting of gases from the combustion chamber, said method comprising, injecting a metered quantity of fuel directly into the combustion chamber so that at low engine loads and speeds at least 80% of the metered quantity of fuel is delivered into the combustion chamber after the exhaust port has closed, and at least at some high engine load at least 80% of the metered quantity of fuel is delivered into the combustion chamber before the exhaust port has closed.

2. A method of operating a spark ignited two cycle internal combustion engine having a combustion chamber, and an exhaust port opened and closed in timed relation to the engine cycle to control the exhausting of gases from the combustion chamber, said method comprising, injecting a metered quantity of fuel directly into the combustion chamber so that at low engine loads and speeds at least 80% of the metered quantity of fuel is delivered into the combustion chamber after the exhaust port has closed, and at high engine loads and speeds at least 80% of the metered quantity of fuel is delivered into the combustion chamber before the exhaust port has closed.

3. A method as claimed in claim 1 or 2 wherein at high engine loads and speeds substantially all the metered quantities of fuel is delivered into the combustion chamber before the exhaust port is closed.

4. A method as claimed in claim 1 or 2 wherein at low loads and speed injection fuel into the combustion chamber is commenced at 5° or more before ignition of the fuel in the combustion chamber.

5. A method as claimed in claim 1 or 2 wherein at low loads and speeds injection of fuel into the combustion chamber is commenced up to 30° after exhaust port closure.

6. A method as claimed in claim 1 or 2 wherein at least at some high loads and speeds injection of fuel into the combustion chamber is commenced before bottom dead centre of the engine cycle.

7. A method as claimed in claim 1 or claim 2, wherein at low engine speeds in conjunction with engine loads below 25% of the load attainable at the particular engine speed, at least 80% of the metered quantity of fuel is delivered to the combustion chamber after the exhaust port is closed.

8. A method as claimed in claim 1 or 2, wherein at low engine speeds in conjunction with engine loads below 25% of the load attainable at the particular engine speed, injection of fuel into the combustion chamber is commenced up to 30° after exhaust port closure.

9. A method as claimed in any one of claims 1 or 2, wherein at least some high loads and speeds injection of fuel into the combustion chamber is commenced before bottom dead centre of the engine cycle and substantially all the metered quantities of fuel is delivered into the combustion chamber before the exhaust port is closed.

10. A method as claimed in claim 6, wherein said injection is commenced before the exhaust port commences to open.

11. A method as claimed in claim 1 or 2, wherein at least at some high loads and speeds injection of fuel into the combustion chamber is terminated before the exhaust port closes.

12. A method as claimed in claim 1 or claim 2, wherein at low engine speeds in conjunction with engine loads below 25% of the load attainable at the particular engine speed, at least 80% of the metered quantity of fuel is delivered to the combustion chamber after the exhaust port is closed and at high engine loads and speeds substantially all the metered quantities of fuel are delivered into the combustion chamber before the exhaust port is closed.

13. A method as claimed in claim 1 or claim 2, wherein at low engine speeds in conjunction with engine loads below 25% of the load attainable at the particular engine speed, at least 80% of the metered quantity of fuel is delivered at the combustion chamber after the exhaust port is closed and at least some high loads and speeds injection of fuel into the combustion chamber is commenced before bottom dead centre of the engine cycle.

14. A method as claimed in claim 1 or 2, wherein at least at some low engine loads ignition of the fuel in the combustion chamber is initiated between 40° and 70° before top dead centre of the engine cycle.

15. A method as claimed in claim 1 or 2, wherein at least at some low engine loads ignition of the fuel in the combustion chamber is initiated at or before 50° before top dead centre of the engine cycle.

16. A method as claimed in claim 1 or 2, wherein at least at some low engine loads ignition of the fuel in the combustion chamber is initiated between 50° and 65° before top dead centre of the engine cycle.

17. A method as claimed in claim 1 or claim 2, wherein at low engine speeds in conjunction with engine loads below 25% of the load attainable at the particular engine speed, at least 80% of the metered quantity of fuel is delivered to the combustion chamber after the exhaust port is closed, and ignition of the fuel in the combustion chamber is initiated between 40° and 70° before top dead centre of the engine cycle.

18. A method as claimed in claim 1 or claim 2, wherein at low engine speeds in conjunction with engine loads below 25% of the load attainable at the particular engine speed, at least 80% of the metered quantity of fuel is delivered to the combustion chamber after the exhaust port is closed, and ignition of the fuel in the combustion chamber is initiated at or before 50° before top dead centre of the engine cycle.

19. A method as claimed in claim 1 or claim 2, wherein at low engine speeds in conjunction with engine loads below 25% of the low attainable at the particular engine speed, at least 80% of the metered quantity of fuel is delivered to the combustion chamber after the exhaust port is closed, and ignition of the fuel in the combustion chamber is initiated between 50° and 65° before top dead centre of the engine cycle.

20. A method as claimed in claim 1 or 2, wherein at low loads and speeds, injection of fuel into the combustion chamber is commenced at 5° or more before ignition of the fuel in the combustion chamber, and ignition of the fuel in the combustion chamber is initiated at or before 50° before top dead centre of the engine cycle.

21. A method as claimed in claim 1 or 2, wherein at low loads and speeds, injection of fuel into the combustion chamber is commenced at 5° or more before ignition of the fuel in the combustion chamber, and ignition of the fuel in the combustion chamber is initiated between 50° and 65° before top dead centre of the engine cycle.

22. A method as claimed in claim 1 or 2, wherein at low loads and speeds injection of fuel into the combustion chamber is commenced up to 30° after exhaust port closure, and ignition of the fuel in the combustion chamber is initiated between 40° and 70° before top dead centre of the engine cycle.

23. A method as claimed in claim 1 or 2, wherein at low loads and speeds injection of the fuel into the combustion chamber is commenced up to 30° after exhaust port closure, and ignition of the fuel in the combustion chamber is initiated between 50° and 65° before top dead centre of the engine cycle.

24. A method as claimed in claim 1 or 2, wherein at low engine speeds in conjunction with engine loads below 25% of the load attainable at the particular engine speed, injection of fuel into the combustion chamber is commenced up to 30° after exhaust port closure, and ignition of the fuel in the combustion chamber is initiated between 40° and 70° before top dead centre of the engine cycle.

25. A method as claimed in claim 1 or 2, wherein at low engine speeds in conjunction with engine loads below 25% of the load attainable at the particular engine speed, injection of fuel into the combustion chamber is commenced up to 30° after exhaust port closure, and ignition of the fuel in the combustion chamber is initiated between 50° and 65° before top dead centre of the engine cycle.

26. A method as claimed in claim 1 or claim 2, wherein at low engine speeds in conjunction with engine loads below 25% of the load attainable at the particular engine speed, at least 80% of the metered quantity of fuel is delivered to the combustion chamber after the exhaust port is closed and at high engine loads and speeds substantially all the metered quantities of fuel are delivered into the combustion chamber before the exhaust port is closed, and ignition of the fuel in the combustion chamber is initiated between 40° and 70° before top dead centre of the engine cycle.

27. A method as claimed in claim 1 or claim 2, wherein at low engine speeds in conjunction with engine loads below 25% of the load attainable at the particular engine speed, at least 80% of the metered quantity of fuel is delivered to the combustion chamber after the exhaust port is closed and at high engine loads and speeds substantially all the metered quantities of fuel are delivered into the combustion chamber before the exhaust port is closed, and ignition of the fuel in the combustion chamber is initiated between 50° and 65° before top dead centre of the engine cycle.

28. A method as claimed in claim 1 or 2, wherein at low engine speeds in conjunction with engine loads below 25% of the load attainable at the particular engine speed, at least 80% of the metered quantity of fuel is delivered to the combustion chamber after the exhaust port is closed and at least some high loads and speeds injection of fuel into the combustion chamber is commenced before bottom dead centre of the engine cycle, and ignition of the fuel in the combustion chamber is initiated between 40° and 70° before top dead centre of the engine cycle.

29. A method as claimed in claim 1 or 2, wherein at low engine speeds in conjunction with engine loads below 25% of the load attainable at the particular engine speed, at least 80% of the metered quantity of fuel is delivered to the combustion chamber after the exhaust port is closed and at least some high loads and speeds injection of fuel into the combustion chamber is commenced before bottom dead centre of the engine cycle, and ignition of the fuel in the combustion chamber is initiated between 50° and 65° before top dead centre of the engine cycle.

30. A method as claimed in claim 1 or 2, wherein the metered quantity of fuel is entrained in a gas to form a fuel-gas charge and said charge is injected into the combustion chamber to effect delivery of the fuel thereinto.

31. A method as claimed in claim 1 or 2, wherein at low loads and speeds injection of fuel into the combustion chamber is commenced up to 30° after exhaust port closure, and wherein the metered quantity of fuel is entrained in a gas to form a fuel-gas charge and said charge is injected into the combustion chamber to effect delivery of the fuel thereinto.

32. A method as claimed in claim 1 or 2, wherein at least some high loads and speeds injection of fuel into the combustion chamber is commenced before bottom dead centre of the engine cycle, and wherein the metered quantity of fuel is entrained in a gas to form a fuel-gas charge and said charge is injected into the combustion chamber to effect delivery of the fuel thereinto.

33. A method as claimed in claim 1 or 2, wherein at least at some low engine loads ignition of the fuel in the combustion chamber is initiated between 40° and 70° before top dead centre of the engine cycle, and wherein the metered quantity of fuel is entrained in a gas to form a fuel-gas charge and said charge is injected into the combustion chamber to effect delivery of the fuel thereinto.

34. An internal combustion engine adapted to operate in accordance with the method as claimed in claim 1 or 2.

35. In an automative vehicle, an internal combustion engine adapted to operate in accordance with the method as claimed in claim 1 or 2.

36. An internal combustion engine adapted to operate in accordance with the method as claimed in claim 1 or 2 said engine being an outboard marine engine.

* * * * *